US008750237B2

(12) United States Patent
Pan et al.

(10) Patent No.: US 8,750,237 B2
(45) Date of Patent: Jun. 10, 2014

(54) METHOD, BASE STATION AND SYSTEM FOR INDICATING CSI FEEDBACK

(75) Inventors: Xueming Pan, Beijing (CN); Zukang Shen, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 13/701,018

(22) PCT Filed: Aug. 16, 2011

(86) PCT No.: PCT/CN2011/078447
§ 371 (c)(1),
(2), (4) Date: Nov. 29, 2012

(87) PCT Pub. No.: WO2012/022249
PCT Pub. Date: Feb. 23, 2012

(65) Prior Publication Data
US 2013/0070720 A1 Mar. 21, 2013

(30) Foreign Application Priority Data
Aug. 16, 2010 (CN) .......................... 2010 1 0255329

(51) Int. Cl.
*H04W 4/00* (2009.01)
*H04B 7/005* (2006.01)
(52) U.S. Cl.
USPC .......................................... 370/329; 370/278
(58) Field of Classification Search
USPC ................................................. 370/210–350
See application file for complete search history.

(56) References Cited

U.S. PATENT DOCUMENTS 7,492,699 B2 * 2/2009 Cho .............................. 370/203
7,564,814 B2 * 7/2009 Abraham et al. ............. 370/329

(Continued)

FOREIGN PATENT DOCUMENTS

| CN | 101635987 A | 1/2010 |
| CN | 101640656 A | 2/2010 |

(Continued)

OTHER PUBLICATIONS

International Research Report for PCT/CN2011/078447—mailed Nov. 24, 2011.

(Continued)

*Primary Examiner* — Warner Wong
(74) *Attorney, Agent, or Firm* — Gilberto M. Villacorta; Kyle R. Canavera; Foley & Lardner LLP

(57) ABSTRACT

The present invention relates to the technical field of wireless communications. Provided are an indication method, a base station, and a system for channel state information (CSI) feedback. The indication method comprises: the base station allocating to a user equipment (UE) a CSI feedback method (S701); by means of allocation signaling, the base station transmitting to the UE the CSI feedback method allocated, instructing the CSI feedback method to be employed by the UE when making an aperiodic CSI report (S702). The feedback method comprises: the UE receiving the allocation instruction transmitted by the base station, acquiring the CSI feedback method allocated for the UE by the base station; when the UE confirms the triggering of an aperiodic CSI report, using the CSI feedback method allocated therefor by the base station. In the present invention, the base station can perform the selection of the appropriate aperiodic CSI feedback method on the basis of the status of carrier allocation, thereby optimizing the CSI feedback mechanism, and improving system design flexibility.

18 Claims, 6 Drawing Sheets

(56) References Cited

U.S. PATENT DOCUMENTS

| | | | |
|---|---|---|---|
| 8,638,684 B2* | 1/2014 | Luo et al. | 370/252 |
| 2005/0232156 A1* | 10/2005 | Kim et al. | 370/236 |
| 2009/0168718 A1* | 7/2009 | Wang et al. | 370/330 |
| 2009/0303951 A1* | 12/2009 | Lunttila et al. | 370/329 |
| 2010/0014500 A1* | 1/2010 | Lee et al. | 370/342 |
| 2010/0202311 A1* | 8/2010 | Lunttila et al. | 370/252 |
| 2010/0254330 A1* | 10/2010 | Lee et al. | 370/329 |
| 2010/0278160 A1* | 11/2010 | Park et al. | 370/338 |
| 2010/0296472 A1* | 11/2010 | Lee et al. | 370/329 |
| 2011/0299467 A1* | 12/2011 | Kim et al. | 370/328 |
| 2013/0058295 A1* | 3/2013 | Ko et al. | 370/329 |
| 2013/0077523 A1* | 3/2013 | Ko et al. | 370/252 |
| 2013/0094392 A1* | 4/2013 | Kim et al. | 370/252 |
| 2013/0100922 A1* | 4/2013 | Ahn et al. | 370/329 |
| 2013/0114461 A1* | 5/2013 | Seo et al. | 370/252 |
| 2013/0114554 A1* | 5/2013 | Yang et al. | 370/329 |
| 2013/0121299 A1* | 5/2013 | Kim et al. | 370/329 |
| 2013/0308558 A1* | 11/2013 | Ye et al. | 370/329 |
| 2013/0308572 A1* | 11/2013 | Sayana et al. | 370/329 |
| 2014/0029490 A1* | 1/2014 | Kim et al. | 370/280 |

FOREIGN PATENT DOCUMENTS

| | | |
|---|---|---|
| CN | 101741506 A | 6/2010 |
| CN | 101873647 A | 10/2010 |
| CN | 102082636 A | 6/2011 |
| CN | 102082643 A | 6/2011 |
| WO | WO-2010/077051 A2 | 7/2010 |

OTHER PUBLICATIONS

Written Opinion of the International Search Authority for PCT/CN2011/078447—mailed Nov. 24, 2011.

Fujitsu: "Aperiodic CQI Reporting for Multiple DL, Component Carriers", 3GPP Draft, RI-104044, Jun. 28-Jul. 2, 2010 in Dresden, Germany, 3 pgs.

Panasonic: "Aperiodic CQI Reporting for Carrier Aggregation", 3GPP Draft, RI-103761, Jun. 28-Jul. 2, 2010 in Dresden, Germany, 3 pgs.

Samsung: "Aperiodic CQI Activation in CA", 3GPP Draft; RI-103652: Jun. 28-Jul. 2, 2010 in Dresden, Germany, 3 pgs.

Supplementary European Examination Report mailed Jul. 19, 2013 in European Application No. 11817776.

* cited by examiner

METHOD, BASE STATION AND SYSTEM FOR INDICATING CSI FEEDBACK

The present application is a US National Stage of International Application No. PCT/CN2011/078447, filed 16 Aug. 2011, designating the United States, and claiming priority to Chinese Patent Application No. 201010255329.4 filed 16 Aug. 2010, the disclosures of which are hereby incorporated by reference in their entireties.

FIELD OF THE INVENTION

The present invention relates to the field of wireless communications and particularly to a method, base station and system for indicating channel state information (CSI) feedback.

BACKGROUND OF THE INVENTION

Transmission of only a single carrier is supported in a Long Term Evolution (LTE) Rel-8 system, and thus a User Equipment (UE) measures a channel quality over only a single downlink carrier and feeds back a measurement result of Channel State Information (CSI). The CSI includes Rank Indicator (RI), Channel Quality Indicator (CQI), Precoding Matrix Indicator (PMI) and other information. A specific feedback can be performed periodically over a Physical Uplink Control Channel (PUCCH) or aperiodically over a Physical Uplink Shared Channel (PUSCH).

When the CSI is transmitted aperiodically over the PUSCH, the RI information is encoded separately, and the CQI and the PMI are encoded separately, and ACK/NACK information is also encoded separately, and all such uplink control information is multiplexed with uplink data as illustrated in FIG. 1. After multiplexing and interleaving, uplink data symbols are mapped to physical resources by firstly mapping the CQI/PMI information and then mapping the uplink data onto the remaining resources. The ACK/NACK and the RI information is mapped by punching the uplink data so that the ACK/NACK is placed in four columns of symbols on both sides of reference signal in an order of ascending frequencies firstly in the time domain and then in the frequency domain and the RI information is mapped in four columns of symbols immediately next to the ACK/NACK in an order of ascending frequencies firstly in the time domain and then in the frequency domain.

In the LTE Rel-8 system, aperiodic transmission of CSI over a PUSCH is triggered by 1-bit CQI Request information in an uplink (UL) grant. If the UE receives the CQI Request bit which is set to 1, then the UE forms the relevant CSI information and inserts in a pre-configured feedback scheme over the PUSCH and transmits it; otherwise, no CSI is transmitted.

In order to support a larger system bandwidth in an LTE-advanced system than in the LTE system, resources of a plurality of LTE carriers (also referred to as component carriers) have to be connected together for use, particularly in two approaches:

1) A plurality of consecutive LTE carriers are aggregated to provide the LTE-A system with a larger transmission bandwidth; and 2) A plurality of inconsecutive LTE carriers are aggregated to provide the LTE-A system with a larger transmission bandwidth.

FIG. 3 illustrates an example of aggregation of a plurality of inconsecutive carriers.

An existing research trend of the standardization organization lies in such a commonly accepted idea of a conceived system with carrier aggregation that a design over each carrier is kept consistent with the LTE Rel-8 as much as possible to thereby ensure a user equipment of the LTE Rel-8 system can operate normally over each component carrier.

A research demand of the existing LTE-A system has been ascertained that aggregation of up to at most 5 component carriers can be supported and a UE can support concurrent transmission/reception of data over at most 5 component carriers.

A support of uplink and downlink asymmetric and symmetric carrier aggregation has been decided in the research on carrier aggregation. Asymmetric and symmetric carrier aggregation can be configured from the perspective of the system (that is, an uplink and downlink asymmetric or symmetric carrier configuration can be supported in the system) or allocated per UE (that is, a UE is allocated with an uplink and downlink asymmetric or symmetric carrier configuration).

Also a discussion has been made in the research on carrier aggregation about the issue on a pairing relationship between uplink and downlink carriers, where a downlink carrier can be paired with one or more uplink carriers and an uplink carrier can also be paired with one or more downlink carriers. From the perspective of the system, such a pairing relationship is as illustrated in FIG. 4A and FIG. 4B with an arrowed connection between an uplink carrier and a downlink carrier representing the presence of a pairing relationship between both of them, where a pair of downlink/uplink carriers with a linking relationship is referred to as a cell, and the correspondence relationship between the uplink and downlink carriers in each cell is broadcasted from the system to all the user equipments in the cell.

FIG. 5 illustrates a UE-specific uplink and downlink asymmetric or symmetric carrier configuration supported in the LTE-A Rel-10, where a UE1 is configured with an uplink and downlink symmetric carrier configuration, and linking relationships of paired carriers in two cells are the same as contents broadcasted in respective system messages. A UE2 is configured with an uplink and downlink asymmetric carrier configuration, and at this time an Uplink Component Carrier (UL CC) can belong to only one cell; and a linking relationship of a UL CC3 with a Downlink Component Carrier (DL CC) 3 applies to the UE, but a linking relationship thereof with a DL CC4 does not apply to the UE, where the DL CC4 is referred to a standalone Downlink Component Carrier (DL CC).

In another scenario, the numbers of uplink and downlink carriers are symmetric from the perspective of the system, and there is a one-to-one linking relationship; and a UE is allocated with asymmetric numbers of uplink and downlink carriers in the system as illustrated in FIG. 6, where the DL CC2 in the figure is also referred to a standalone DL CC, and also this configuration scenario has to be supported in the LTE-A Rel-10.

Following a discussion about the capability of an LTE-A Rel-10 user equipment, user equipments with an uplink and downlink symmetric aggregation capability and an uplink and downlink asymmetric aggregation capability will be present in the Rel-10, where each user equipment reports its own uplink and downlink carrier aggregation capability to a base station in an initial access procedure. The base station cannot configure downlink and uplink carriers beyond the uplink and downlink carrier aggregation capability of the user equipment.

Solutions to carrier activation/deactivation have been introduced in the LTE-A Rel-10, where activation and deactivation of a downlink carrier is triggered by a Media Access Control layer Control Element (MAC CE), and the UE measures and feeds back CSI only over an activated DL CC.

In the LTE Rel-8, a aperiodic CSI feedback is triggered by a 1-bit CQI Request information in a UL grant. In the discussion about the LTE-A, it is generally recognized that a 1-bit CQI Request in a UL grant continues the use of the design in the LTE Rel-8 without any extension or modification, and specific multi-carrier aperiodic CSI feedback schemes are as follows:

In a first scheme, aperiodic CSI information of a plurality of DL CCs are fed back concurrently;

The UE is triggered by a 1-bit CQI Request information in a UL grant to put aperiodic CSI information of all the activated DL CCs over a PUSCH scheduled by the UL grant for feedback together. This scheme is the simplest but has a drawback of a considerable feedback overhead and thus poses a considerable influence upon transmission performance over the PUSCH, especially when the UE is configured with a plurality of downlink component carriers (up to 5) and there is a small physical resource scheduled over the PUSCH.

In a second scheme, aperiodic CSI information of each DL CC is fed back separately, particularly in the following two schemes, and such schemes also have their corresponding restrictions although they avoid the problem of a feedback overhead resulting from CSI information of a plurality of DL CCs being fed back concurrently.

In a scheme 2-1, the UE is triggered by a 1-bit CQI Request information in a UL grant to put aperiodic CSI information, of each DL CC in which the UL grant is transmitted from the network, over a PUSCH scheduled by the UL grant for feedback.

This scheme has such drawbacks that: 1) for a UE configured with cross-carrier scheduling, e.g., the UE1 in FIG. 5, where a dotted arrow represents a configuration of uplink cross-carrier scheduling, that is, PUSCH transmission of both the UL CC1 and the UL CC2 is scheduled by a UL grant over the DL CC1, here no UL grant is transmitted over the DL CC2 as concluded so far, and a aperiodic CSI feedback of the DL CC2 cannot be triggered; and 2) no UL grant will be transmitted over a standalone downlink component carrier as concluded so far, and thus a aperiodic CSI feedback thereof cannot be triggered either.

In a scheme 2-2, the UE is triggered by a 1-bit CQI Request information in a UL grant to put aperiodic CSI information, of each DL CC having a system-level paired linking relationship with each UL CC scheduled by the UL grant, over a PUSCH scheduled by the UL grant for feedback.

This scheme has such a drawback that aperiodic CSI of a part of DL CCs of a UE configured with uplink and downlink carriers cannot be fed back, e.g., the DL CC4 of the UE2 in FIG. 5 and the DL CC2 of the UE3 in FIG. 6.

SUMMARY OF THE INVENTION

Embodiments of the invention provide a method of indicating a CSI feedback, a method of feeding back CSI, a UE, a base station and a wireless communication system as CSI feedback schemes applicable to a multi-carrier system.

The invention provides a method of indicating a CSI feedback, which includes:

a base station configuring a UE with a CSI feedback scheme; and the base station transmitting the configured CSI feedback scheme to the UE in configuration signaling to indicate the CSI feedback scheme to be adopted by the UE in aperiodic CSI reporting.

The invention further provides a method of feeding back CSI, which includes:

a UE receiving configuration signaling transmitted from a base station and obtaining a CSI feedback scheme configured for the UE by the base station; and the UE feeding back CSI in the CSI feedback scheme configured for the UE by the base station upon determining that aperiodic CSI reporting is triggered.

The invention further provides a base station including:

a feedback scheme configuring unit configured to configure a UE with a CSI feedback scheme; and a feedback scheme indicating unit configured to transmit the configured CSI feedback scheme to the UE in configuration signaling to indicate the CSI feedback scheme to be adopted by the UE in aperiodic CSI reporting.

The invention further provides a UE including:

a feedback scheme obtaining unit configured to receive configuration signaling transmitted from a base station and to obtain a CSI feedback scheme configured for the UE by the base station; and a CSI feedback unit configured to feed back CSI in the CSI feedback scheme configured for the UE by the base station upon determining that aperiodic CSI reporting is triggered.

The invention further provides a wireless communication system including:

a base station configured to configure a UE with CSI feedback scheme and to transmit the configured CSI feedback scheme to the UE in configuration signaling to indicate the CSI feedback scheme to be adopted by the UP in aperiodic CSI reporting; and the UE configured to receive the configuration signaling transmitted from the base station, to obtain the CSI feedback scheme configured for the UE by the base station, and to feed hack CSI in the CSI feedback scheme configured for the UE by the base station upon determining that aperiodic CSI reporting is triggered.

With the method of indicating CSI feedback, method of feeding back CSI, UE, base station and wireless communication system according to the invention, such an advantageous effect is attainable that the base station can select an appropriate aperiodic CSI feedback scheme dependent upon a carrier configuration condition of the system or the user equipment to thereby improve the flexibility of designing the system.

DETAILED DESCRIPTION OF THE EMBODIMENTS

A method of indicating a CSI feedback, a method of feeding back CSI, a UE, a base station and a wireless communication system according to the invention will be described below in details with reference to the drawings and embodiments thereof.

In order to perform carrier scheduling and link adaptation processes effectively in an LTE-A system with carrier aggregation, a base station shall obtain CSI feedbacks of a plurality of DL CCs measured by a UE and hereby perform multi-carrier scheduling, where CSI fed back from the LIE can include, for example, RI information, CQI information, wide-band PMI information, etc., and a CQI includes a wideband CQI and a sub-band CQI.

Figure 7:
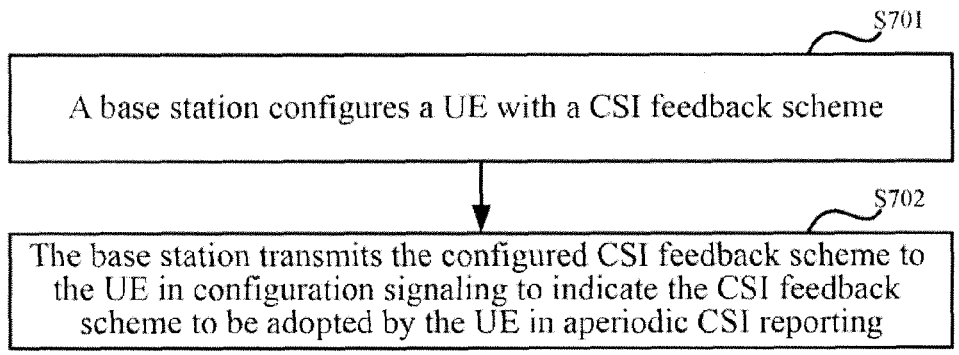
FIG. 7 is a schematic flow chart of a method of indicating a CSI feedback according to an embodiment of the invention.

A 1-bit CQI request in a UL grant in an existing multi-carrier system continues the use of the design in the LTE Rel-8, and the specific multi-carrier aperiodic CSI feedback schemes have their own advantages and disadvantages and are applicable to different carrier configuration conditions of a system or a UE. The invention provides a method of indicating a CSI feedback. As illustrated in FIG. 7, the method includes:

In the step S701, a base station configures a UE with a CSI feedback scheme;

As described above, user equipments with an uplink and downlink symmetric aggregation capability and an uplink and downlink asymmetric aggregation capability will be present in the LTE-A Rel-10 system, where each user equipment reports its own uplink and downlink carrier aggregation capability to a base station in an initial access procedure. The base station cannot configure downlink and uplink carriers beyond the uplink and downlink carrier aggregation capability or the user equipment.

In this embodiment, the base station configures the UE with a corresponding CSI feedback scheme dependent upon a carrier configuration condition of the UE in a multi-carrier system. In this embodiment, the UE can design flexibly a CSI feedback scheme suitable for the carrier configuration condition of the UE dependent upon the carrier configuration condition of the UE, where a preferred CSI feedback scheme can be selected according to a scenario on one hand, and the flexibility of designing the system can be improved on the other hand.

In the step S702, the base station transmits the configured CSI feedback scheme to the UE in configuration signaling to indicate the CSI feedback scheme to he adopted by the UE in aperiodic CSI reporting.

The invention enables the base station to configures selectively the UE to adopt an appropriate aperiodic CSI feedback scheme in a different scenario to thereby avoid the drawbacks in the prior art of the use of only one feedback mechanism and of the impossibility to design flexibly a CSI feedback scheme of the system.

The base station can design a CSI feedback scheme suitable for the UE dependent upon the carrier configuration condition of the UE by selecting from existing CSI feedback schemes a CSI feedback scheme suitable for the UE, and preferably the CSI feedback scheme configured for the CE by the base station is any CSI feedback scheme selected from system configured feedback schemes including a joint feedback scheme and a first independent feedback scheme or including a joint feedback scheme and a second independent feedback scheme or including a joint feedback scheme, a first independent feedback scheme and a second independent feedback scheme, where:

1) Joint Feedback Scheme

Specifically, CSI of all the activated DL CCs of the UE is put over a PUSCH scheduled by a UL grant for feedback;

This feedback scheme has such an advantage that all the CSI is fed back but also a disadvantage of a considerable feedback overhead, so this feedback scheme can be applicable to some UE which cannot feed back all the CSI in other feedback schemes although it is not applicable to all the UEs.

2) First Independent Feedback Scheme

CSI of each DL CC over which a UL grant is transmitted from the base station is put over a PUSCH scheduled by the UL grant for feedback;

This feedback scheme has such an advantage that aperiodic CSI information of each DL CC is fed back separately to thereby avoid the problem of a feedback overhead resulting from CSI information of a plurality of DL CCs being fed back concurrently but also such a disadvantage that this pattern is not applicable to a CE configured with DL CCs between which there is a significant difference in channel quality, for example, in an application scenario where the base station configures cross-carrier scheduling when the difference is above a preset threshold.

3) Second Independent Feedback Scheme

CSI of each DL CC having a system-level paired linking relationship with each UL CC scheduled by a UL grant, is put over a PUSCH scheduled by the UL grant for feedback.

This feedback scheme has such an advantage that aperiodic CSI information of each DL CC is fed back separately to thereby avoid the problem of a feedback overhead resulting from CSI information of a plurality of DL CCs being fed back concurrently but also such a disadvantage that the UE with an asymmetric configuration of uplink and downlink carriers cannot feed back aperiodic CSI information of all the DL CCs.

Thus a CSI feedback scheme suitable for the UE can be selected dependent upon a specific application scenario in an implementation of the invention. Of course a specific CSI feedback scheme can alternatively be any other feedback scheme that can occur to those skilled in the art. Regardless of whichever specific feedback scheme, the base station selects a CSI feedback scheme the most suitable for the UE taking into account the advantage and the disadvantage of the specific feedback scheme and notifies the UE in configuration signaling.

The configuration signaling in this embodiment can particularly be Radio Resource Control (RRC) signaling (cell-specific or UE-specific) or MAC CE signaling specific to the UE or Physical Downlink Control Channel (PDCCH) signaling specific to the UE. Of course, the configuration signaling can alternatively be newly defined to feed back the configured CSI feedback scheme. The configured CSI feedback scheme can be carried in configuration signaling particularly by setting identification information corresponding to the different feedback schemes and carrying the identification information corresponding to the configured CSI feedback scheme in the configuration signaling.

Schemes to configure a UE with a CSI feedback scheme will he presented below dependent upon a carrier configuration condition of the UE and the advantages and disadvantage of the respective feedback schemes described above in embodiments of the invention.

1) For a UE with a Symmetric Configuration of Uplink and Downlink Carriers

Figure 1:
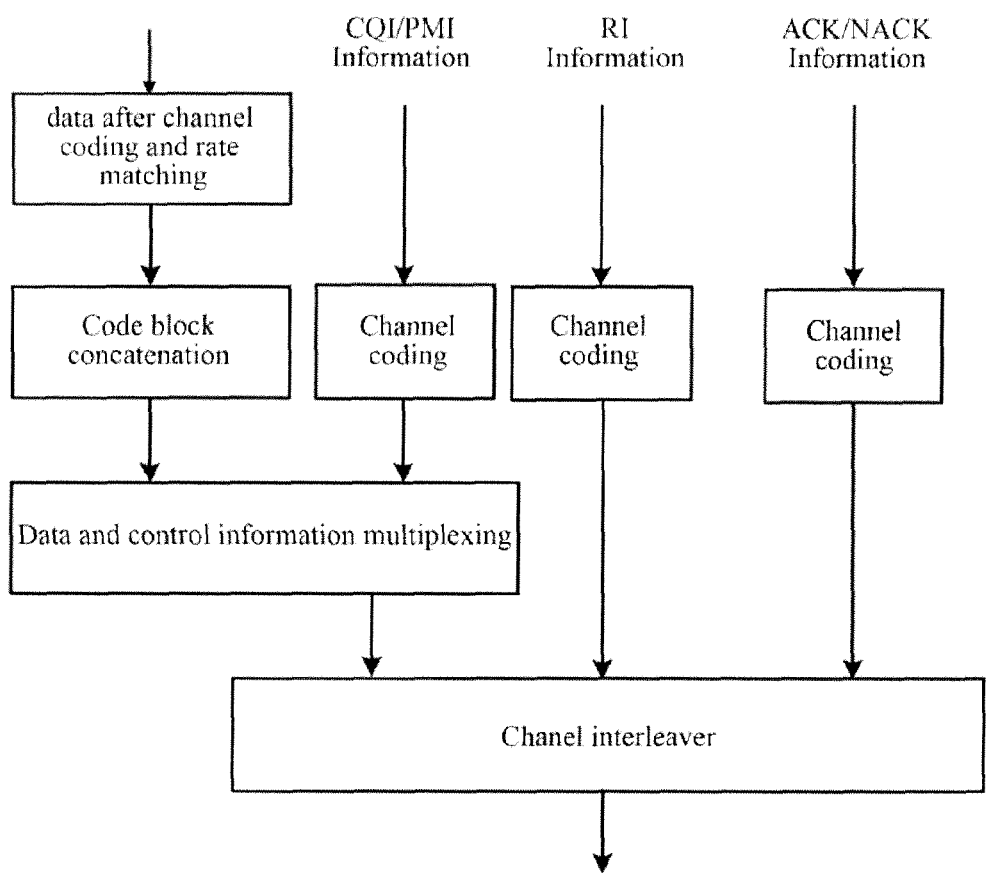
FIG. 1 is a flow chart of multiplexing uplink control information and uplink data in the prior art.
Figure 2:
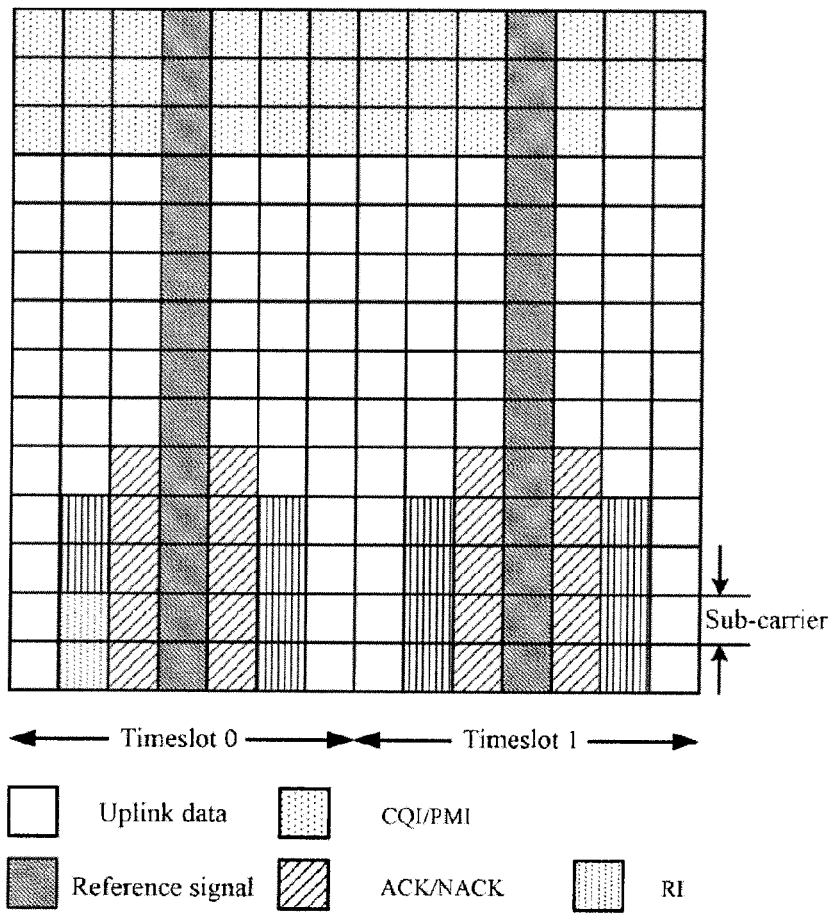
FIG. 2 is a schematic diagram of mapping uplink control information onto uplink physical resources in the prior art.
Figure 3:
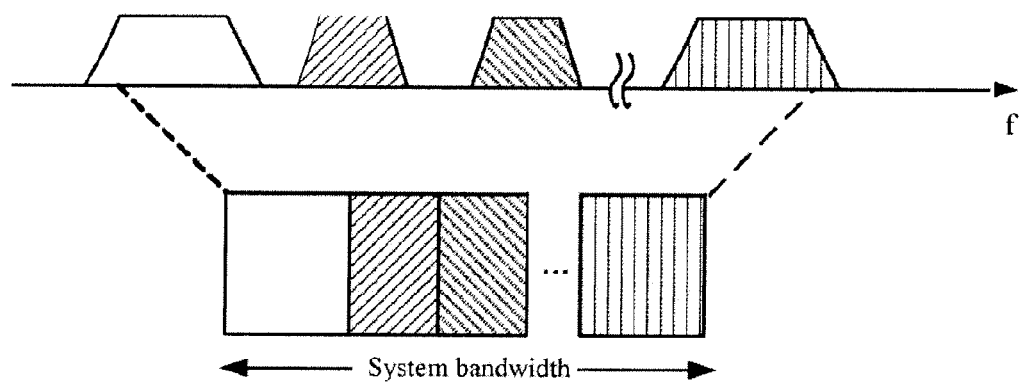
FIG. 3 is a schematic diagram of carrier aggregation adopted in an LTE-A system.
Figure 4A:
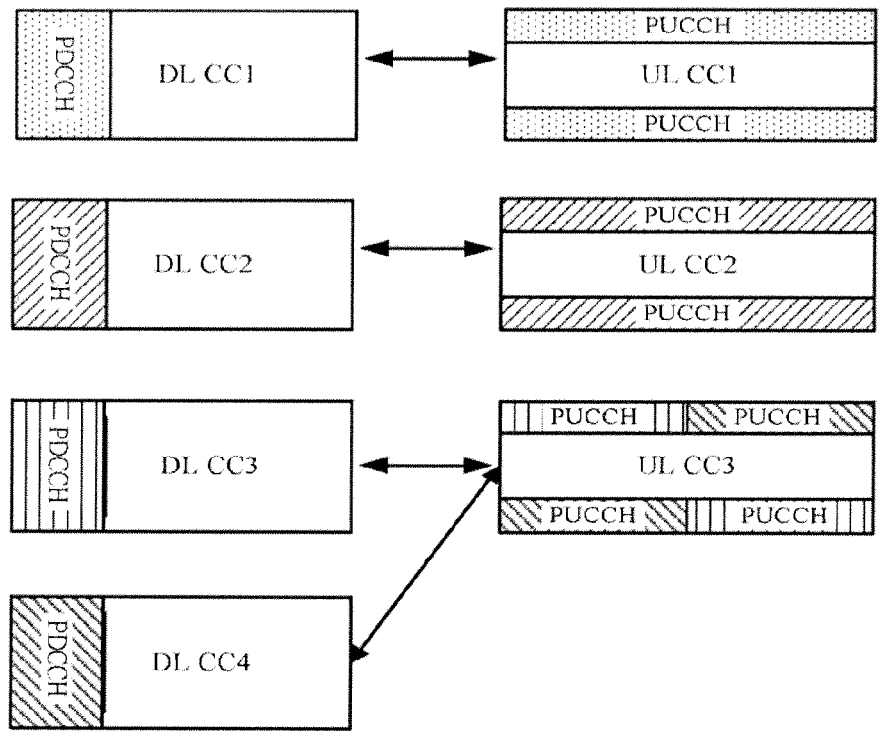
FIG. 4A is a schematic diagram of an asymmetric configuration of uplink and downlink carriers provided in a linking relationship from the perspective of the system.
Figure 4B:
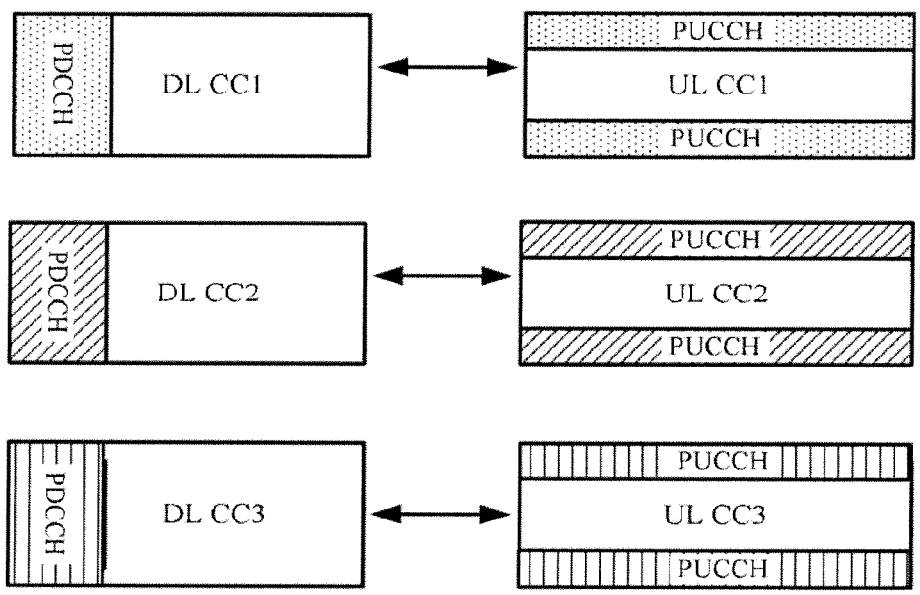
FIG. 4B is a schematic diagram of a symmetric configuration of uplink and downlink carriers provided in a linking relationship from the perspective of the system.
Figure 5:
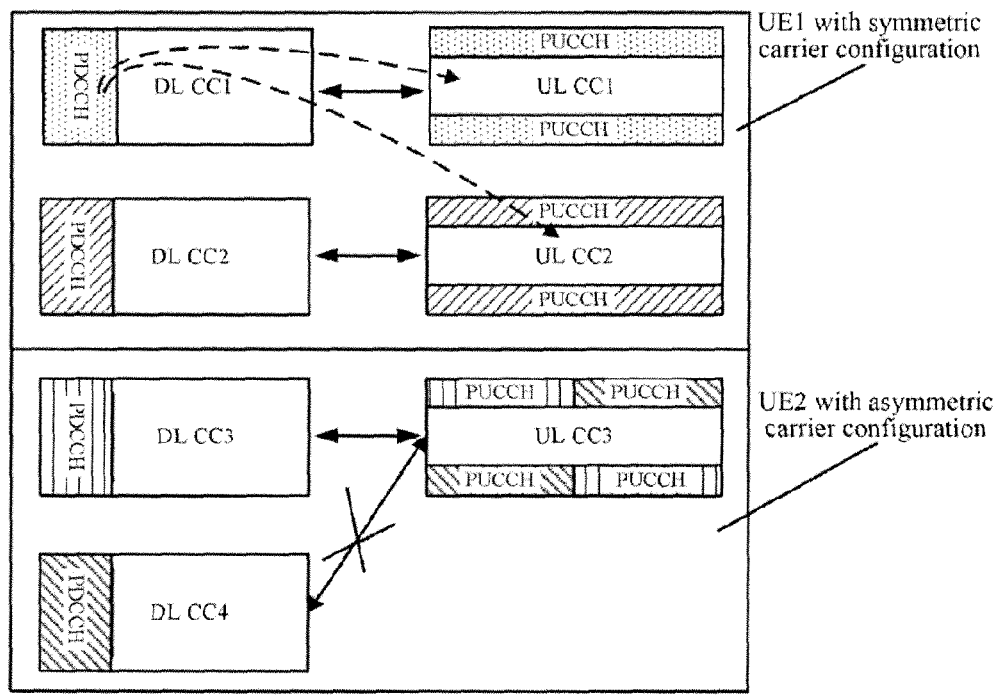
FIG. 5 is a schematic diagram of asymmetric/symmetric configurations of uplink and downlink carriers provided from the perspective of a UE.
Figure 6:
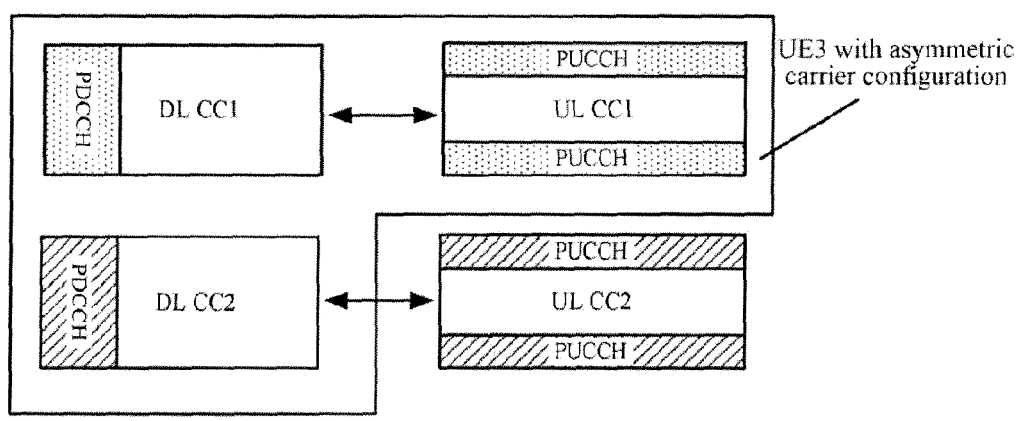
FIG. 6 is a schematic diagram of an asymmetric configuration of uplink and downlink carriers provided from the perspective of a UE.

A UE with a symmetric configuration of UL CCs and DL CCs, e.g., the UE1 in FIG. 5, is configured with the first independent feedback scheme or the second independent feedback scheme, and when the first independent feedback scheme is configured, CSI of each DL CC over which a UL grant is transmitted from the base station is put over a PUSCH scheduled by the UL grant for feedback; and when the second independent feedback scheme is configured, the UE puts CSI of each DL CC having a system-level paired linking relationship with each UL CC scheduled by a UL grant, over a PUSCH scheduled by the UL grant for feedback.

When the second independent feedback scheme is configured, such a situation will not happen that CSI of a DL CC over which a UL grant scheduling a UL CC pared with the DL CC is not transmitted is not fed back in cross-carrier scheduling. Due to the symmetric configuration of uplink and downlink carriers, such a situation will not happen that CSI of a standalone DL CC is not fed back.

Furthermore the UE with the symmetric configuration of UL CCs and DL CCs can further be configured as follows: the UE is configured with the first independent feedback scheme or the second independent feedback scheme when the UE is configured with DL CCs between which the difference in channel quality satisfies a preset requirement; and the UE is configured with the second independent feedback scheme when the UP, is configured with DL CCs between which the difference in channel quality does not satisfy the preset requirement.

The base station will perform cross-carrier scheduling upon determining that the UE is configured with a plurality of DL CCs between which there is a considerable difference in channel quality. As illustrated in FIG. 5, when determining serious interference between the DL CC1 and the DL CC2 of the UE1, the base station will perform cross-carrier transmission, over the DL CC1, of a UL grant scheduling the UL CC2, which would otherwise be transmitted over the DL CC2. If there is a considerable difference in channel quality between the DL CCs, then the second independent feedback scheme can be adopted; otherwise, CSI information can also be well fed hack in the first independent feedback scheme.

Thus the base station can determine whether the UE adopts the first independent feedback scheme or the second independent feedback scheme dependent upon the difference in channel quality between DL CCs configured for the UE in the embodiment of the invention.

2) For a UE with an Asymmetric Configuration of Uplink and Downlink Carriers

A UE with an asymmetric configuration of UL CCs and DL CCs is configured with the joint feedback scheme.

Since the UE with an asymmetric configuration of uplink and downlink carriers cannot feed back CSI information of a standalone DL CC in either the first independent feedback scheme or the second independent feedback scheme, the joint feedback scheme is adopted for the UE with an asymmetric configuration of uplink and downlink carriers in the embodiment of the invention. A considerable resource overhead will not be incurred due to a limited number of UEs with an asymmetric configuration of uplink and downlink carriers in the system.

A specific scheme to configure a CSI feedback scheme for a UE with a different CC configuration will not be limited to the foregoing several schemes in the embodiments of the invention, and when there are other application scenarios and other feedback patters in practice, the UE can be configured flexibly dependent upon advantages and disadvantages of the respective feedback schemes.

Furthermore only one of the two independent feedback schemes may be selected to be configured with, and at this time the CSI feedback schemes configured by the base station includes two feedback schemes, i.e., the joint feedback scheme and the independent feedback scheme.

Furthermore in the embodiments of the invention, the base station can notify in the configuration signaling, the UE of the CSI feedback scheme to be used, and thus the base station can update and notify the UE of the CSI feedback scheme in real time when the CSI feedback scheme suitable for the UE is reselected because the carrier configuration condition of the UE is updated or other information is updated.

Figure 8:
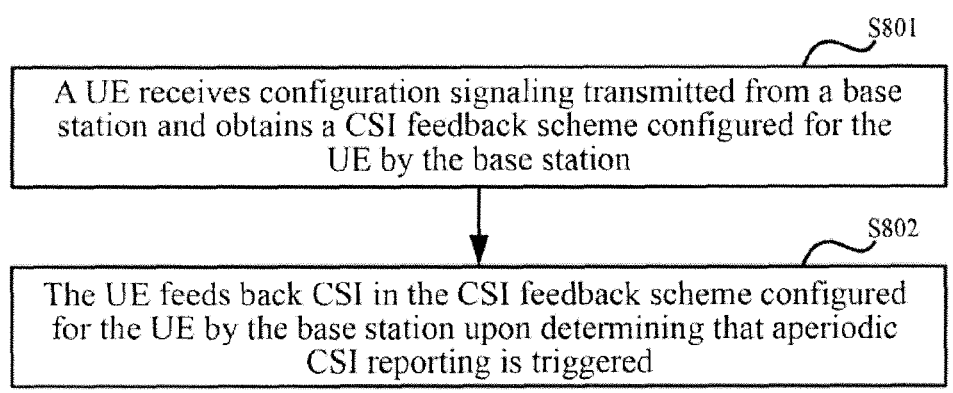
FIG. 8 is a schematic flow chart of a method of feeding back CSI according to an embodiment of the invention.

There is a method of feeding back CSI provided in another embodiment of the invention, and as illustrated in FIG. 8, the method includes:

In the step S801, UE receives configuration signaling transmitted from a base station and obtains a CSI feedback scheme configured for the UE by the base station;

The configuration signaling can particularly be RRC signaling (cell-specific or UE-specific) or MAC CE signaling specific to the UE or PDCCH signaling specific to the UE. Of course, the configuration signaling can alternatively be signaling newly defined to feed hack the configured CSI feedback scheme.

In the step S802, the UE feeds back CSI in the CSI feedback scheme configured for the UE by the base station upon determining that aperiodic CSI reporting is triggered.

The UE can determine that aperiodic CSI reporting is triggered by continuing the use of the design in the LTE Rel-8, particularly as follows: the UE determines that aperiodic CSI reporting is triggered, according to a UL grant transmitted from the base station in which a CQI Request is set, and determines not to perform aperiodic CSI reporting when the CQI Request in the UL grant is not set.

The UE feeds back CSI in the CSI feedback scheme indicated by the base station to thereby avoid the drawback when the UE reports CSI uniformly in the same CSI feedback scheme.

The UE feeds back CSI in the CSI feedback scheme configured for the UE by the base station in the embodiment of the invention particularly as follows:

The UE puts CSI of all the activated DL CCs over a PUSCH scheduled by a UL grant for feedback upon determining the CSI feedback scheme configured for the UE by the base station as a joint feedback scheme;

The UE puts CSI, of each DL CC over which a UL grant is transmitted from the base station, over a PUSCH scheduled by the UL grant for feedback upon determining the CSI feedback scheme configured for the UE by the base station as a first independent feedback scheme; and The UE puts CSI, of each DL CC having a system-level paired linking relationship with each UL CC scheduled by a UL grant, over a PUSCH scheduled by the UL grant for feedback upon determining the CSI feedback scheme configured for the UE by the base station as a second independent feedback scheme.

Specifically the CSI feedback scheme obtained by the UE is the first independent feedback scheme or the second independent feedback scheme when the UE is configured symmetrically with UL CCs and DL CCs; or The CSI feedback scheme obtained by the UE is the first independent feedback scheme or the second independent feedback scheme when the UE is configured symmetrically with UL CCs and DL CCs and the difference in channel quality between the DL CCs configured for the UE satisfies a preset requirement; and the CSI feedback scheme obtained by the UE is the second independent feedback scheme when the UE is configured symmetrically with UL CCs and DL CCs and the difference in channel quality between the DL CCs configured for the UE does not satisfy the preset requirement; or The CSI feedback scheme obtained by the UE is the joint feedback scheme when the UE is configured asymmetrically with UL CCs and DL CCs.

The UE can continue the use of specific information in CSI determined in the LTE Rel-8 to be fed back upon determining the CSI feedback scheme. Specifically a corresponding number of bits of CSI are selected for feedback in the feedback mode configured for the UE by the base station.

In the LTE Rel-8 system, the UE feeds back CSI aperiodically over a PUSCH in numerous different feedback modes, where specific CQI/PMI feedback modes are defined as depicted in Table 1:

TABLE 1

CQI/PMI feedback m

| | | PMI feedback type | | |
|---|---|---|---|---|
| | | No PMI | Single PMI | Multiple PMIs |
| PUSCH CQI feedback type | Wideband CQI | | | 1-2 |
| | UE selected sub-band CQI | 2-0 | | 2-2 |
| | Higher-layer configured sub-band CQI | 3-0 | 3-1 | |

Particularly there are a limited number of optional feedback modes in each transmission mode and particularly as specified below, which feedback mode is adopted by the UE in a specific transmission mode is configured by the base station in higher-layer signaling.

Optional feedback modes correspond to transmission modes as follows:

Transmission mode 1: Feedback mode 2-0 and Feedback mode 3-0;

Transmission mode 2: Feedback mode 2-0 and Feedback mode 3-0;

Transmission mode 3: Feedback mode 2-0 and Feedback mode 3-0;

Transmission mode 4: Feedback mode 1-2, Feedback mode 2-2 and Feedback mode 3-1;

Transmission mode 5: Feedback mode 3-1;

Transmission mode 6: Feedback mode 1-2, Feedback mode 2-2 and Feedback mode 3-1; and Transmission mode 7: Feedback mode 2-0 and Feedback mode 3-0.

Here the 7 transmission modes are respectively:
Transmission mode 1: Single antenna port using port 0;
Transmission mode 2: Transmit diversity;
Transmission mode 3: Open-loop spatial multiplexing;
Transmission mode 4: Closed-loop spatial multiplexing;
Transmission mode 5: MU-MIMO (Multi-User Multiple Input Multiple Output);
Transmission mode 6: Closed-loop spatial multiplexing (rank=1); and
Transmission mode 7: Single antenna port using port 5.

In the LTE Rel-8, an RI is fed back only in the transmission mode 3 and the transmission mode 4, and the RI is 1-bit information when the base station configures a 2-antenna port. For a high-level UE, the RI is fed back as 2-bit information when the base station configures a 4-antenna port.

The length in bits of the CQI/PMI fed back from the UE over the PUSCH is related to the specific feedback mode and the number of sub-bands defined in the system and the like, and the base station firstly reads the RI information over the PUSCH and then reads the CQI/PMI information according to a corresponding format based on the rank given by the RI information.

There are listed below the lengths in bits corresponding to the feedback mode 1-2, the feedback mode 2-0, the feedback mode 2-2, the feedback mode 3-0 and the Feedback mode 3-1 in which the UE feeds a CQI/PMI over a PUSCH, 1) Feedback Mode 1-2

As depicted in Table 2, the feedback mode 1-2 is a "Wideband CQI and Multiple PMIs" mode including wideband CQI information of 1 to 2 space codewords (4 bits per codeword) and PMI information of N sub-bands, where N is the number of sub-bands in the system. Specific information is as depicted in Table 2

TABLE 2

Number of bits corresponding to Feedback mode 1-2

| | Number of bits | | | |
|---|---|---|---|---|
| | 2-antenna port | | 4-antenna port | |
| Field | Rank = 1 | Rank = 2 | Rank = 1 | Rank > 1 |
| Wideband CQI codeword 0 | 4 | 4 | 4 | 4 |
| Wideband CQI codeword 1 | 0 | 4 | 0 | 4 |
| PMIs of N sub-bands | 2N | N | 4N | 4N |

2) Feedback Mode 2-0

The feedback mode 2-0 is a "UE selected sub-band CQI but no PMI" mode, as depicted in Table 3, including wideband CQI information (4 bits) of one codeword and information on one differential CQI (2 bits) reflecting M UE-selected sub-bands, where L is sub-band number indication information of M sub-bands selected from N sub-bands, and the values of both N and M are standard-specified and system broadcast-related.

TABLE 3

Number of bits corresponding to Feedback mode 2-0

| Field | Number of bits |
|---|---|
| Wideband CQI codeword | 4 |
| Differential CQI of M sub-bands | 2 |
| Locations of M sub-bands | L |

3) Feedback Mode 2-2

The feedback mode 2-2 is a "UE selected sub-bands and multiple PMIs" mode, as depicted in Table 4, including wideband CQI information of 1 to 2 space codewords (4 bits each), differential CQI information of M UE-selected sub-bands of 1 to 2 space codewords (2 bits each) and information on one sub-band PMI and one wideband PMI.

TABLE 4

Number of bits corresponding to Feedback mode 2-2

| | Number of bits | | | |
|---|---|---|---|---|
| | 2-antenna port | | 4-antenna port | |
| Field | Rank = 1 | Rank = 2 | Rank = 1 | Rank > 1 |
| Wideband CQI codeword 0 | 4 | 4 | 4 | 4 |
| Differential CQI codeword 0 of M sub-bands | 2 | 2 | 2 | 2 |
| Wideband CQI codeword 1 | 0 | 4 | 0 | 4 |
| Differential CQI codeword 1 of M sub-bands | 0 | 2 | 0 | 2 |
| Locations of M sub-bands | L | L | L | L |
| One sub-band PMI and one wideband PMI | 4 | 2 | 8 | 8 |

4) Feedback Mode 3-0

The feedback mode 3-0 is a "Higher-layer configured sub-band CQI but no PMI" mode, as depicted in Table 5, including information on one wideband CQI (4 bits) and differential CQI information of N sub-bands (2 bits each).

TABLE 5

Number of bits corresponding to Feedback mode 3-0

| Field | Number of bits |
|---|---|
| Wideband CQI codeword | 4 |
| Differential CQI of N sub-bands | 2N |

5) Feedback Mode 3-1

The feedback mode 3-1 is a "Higher-layer configured sub-band CQI and single PMI" mode, as depicted in Table 6, including wideband CQI information of 1 to 2 space codewords (4 bits each), differential CQI information of N sub-bands of 1 to 2 space codewords (2 bits each) and information on one PMI.

TABLE 6

Number of bits corresponding to Feedback mode 3-1

| | Number of bits | | | |
|---|---|---|---|---|
| | 2-antenna port | | 4-antenna port | |
| Field | Rank = 1 | Rank = 2 | Rank = 1 | Rank > 1 |
| Wideband CQI codeword 0 | 4 | 4 | 4 | 4 |
| Differential CQI codeword 0 of N sub-bands | 2N | 2N | 2N | 2N |
| Wideband CQI codeword 1 | 0 | 4 | 0 | 4 |
| Differential CQI codeword 1 of N sub-bands | 0 | 2N | 0 | 2N |
| PMI | 2 | 1 | 4 | 4 |

Figure 9:
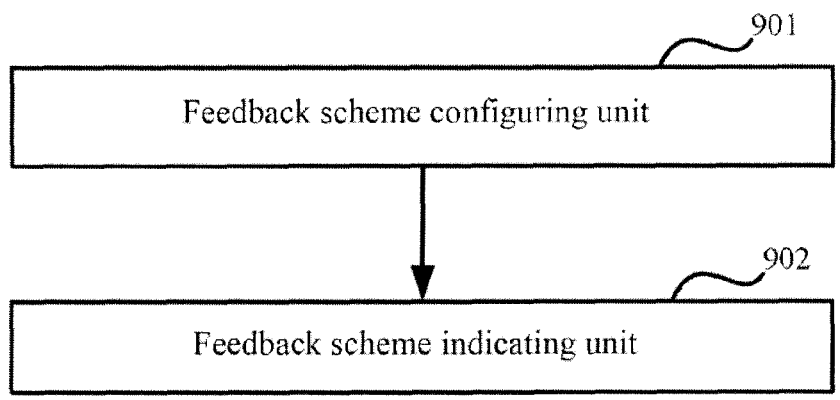
FIG. 9 is a structural diagram of a base station according to an embodiment of the invention.

There is further provided in an embodiment of the invention a base station, and as illustrated in FIG. 9, the base station includes: a feedback scheme configuring unit 901 configured to configure a UE with a CSI feedback scheme; and a feedback scheme indicating unit 902 configured to transmit the configured CSI feedback scheme to the UE in configuration signaling to indicate the CSI feedback scheme to he adopted by the UE in aperiodic CSI reporting.

Preferably the feedback scheme configuring unit 901 is particularly configured to configure the UE with the corresponding CSI feedback scheme dependent upon a carrier configuration condition of the UE.

In this embodiment the feedback scheme configuring unit 901 is particularly configured to configure the UE with the CSI feedback scheme by selecting one of system configured feedback schemes including a joint feedback scheme and a first independent feedback scheme or including a joint feedback scheme and a second independent feedback scheme or including a joint feedback scheme, a first independent feedback scheme and a second independent feedback scheme.

The joint feedback scheme is particularly to put CSI of all the activated DL CCs of the UE over a PUSCH scheduled by a UL grant for feedback; the first independent feedback scheme is particularly to put CSI, of each DL CC over which a UL grant is transmitted from the base station, over a PUSCH scheduled by the UL grant for feedback; and the second independent feedback scheme is particularly to put CSI, of each DL CC having a system-level paired linking relationship with each UL CC scheduled by a UL grant, over a PUSCH scheduled by the UL grant for feedback.

The feedback scheme configuring unit 901 is particularly configured to configure the UE with the first independent feedback scheme or the second independent feedback scheme when the UE is configured symmetrically with UL CCs and DL CCs.

Alternatively, the feedback scheme configuring unit 901 is particularly configured to configure the UE with the first independent feedback scheme or the second independent feedback scheme when the UE is configured symmetrically with UL CCs and DL CCs and the difference in channel quality between the DL CCs configured for the UE satisfies a preset requirement; and to configure the UE with the second independent feedback scheme when the UE is configured symmetrically with UL CCs and DL CCs and the difference in channel quality between the DL CCs configured for the UE does not satisfy the preset requirement.

The feedback scheme configuring unit 901 is particularly configured to configure the UE with the joint feedback scheme when the UE is configured asymmetrically with UL CCs and DL CCs.

The configuration signaling adopted by the feedback scheme indicating unit 902 is particularly RRC signaling or MAC CE signaling specific to the UE or PDCCH signaling specific to the UE.

Figure 10:
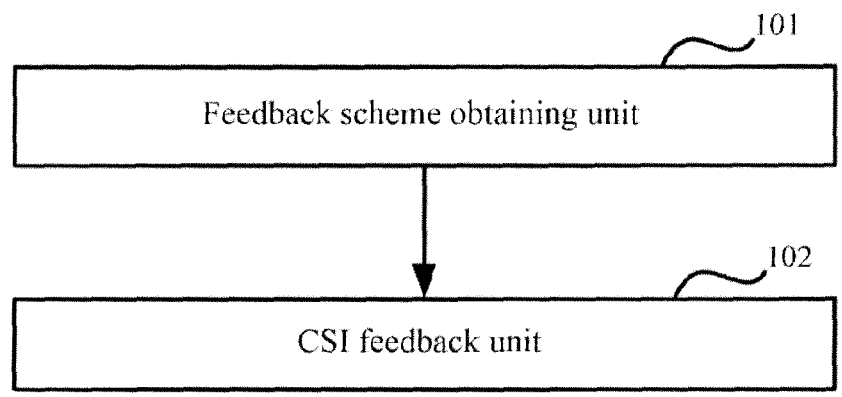
FIG. 10 is a structural diagram of a UE according to an embodiment of the invention.

There is a UE further provided in an embodiment of the invention, and as illustrated in FIG. 10, the HE includes: a feedback scheme obtaining unit 101 configured to receive configuration signaling transmitted from a base station and to obtain a CSI feedback scheme configured for the UE by the base station; and a CSI feedback unit 102 configured to feed back CSI in the CSI feedback scheme configured for the UE by the base station upon determining that aperiodic CSI reporting is triggered.

The CSI feedback unit 102 is particularly configured to determine that aperiodic CSI reporting is triggered, according to a UL grant transmitted from the base station in which a CQI Request is set.

The CSI feedback unit 102 is particularly configured to put CSI of all the activated DL CCs over a PUSCH scheduled by a UL grant for feedback upon determining the CSI feedback scheme configured for the UE by the base station as a joint feedback scheme; to put CSI, of each DL CC over which a UL grant is transmitted from the base station, over a PUSCH scheduled by the UL grant for feedback upon determining the CSI feedback scheme configured for the UE by the base station as a first independent feedback scheme; and to put CSI, of each DL CC having a system-level paired linking relationship with each UL CC in a UL grant, over a PUSCH scheduled by the UL grant for feedback upon determining the CSI feedback scheme configured for the UE by the base station as a second independent feedback scheme.

The feedback scheme obtaining unit 101 obtains the CSI feedback scheme which is the first independent feedback scheme or the second independent feedback scheme when the UE is configured symmetrically with UL CCs and DL CCs.

Alternatively, the feedback scheme obtaining unit 101 obtains the CSI feedback scheme which is the first independent feedback scheme or the second independent feedback scheme when the UE is configured symmetrically with UL CCs and DL CCs and the difference in channel quality between the DL CCs configured for the LIE satisfies a preset requirement; and obtains the CSI feedback scheme which is the second independent feedback scheme when the UE is configured symmetrically with UL CCs and DL CCs and the difference in channel quality between the DL CCs configured for the UE does not satisfy the preset requirement.

The feedback scheme obtaining unit 101 obtains the CSI feedback scheme which is the joint feedback scheme when the UE is configured asymmetrically with UL CCs and DL CCs.

There is further provided in an embodiment of the invention a wireless communication system including: a base station configured to configure a UE with a CSI feedback scheme and to transmit the configured CSI feedback scheme to the UE in configuration signaling to indicate the CSI feedback scheme to be adopted by the UE in aperiodic CSI reporting; and the UE configured to receive the configuration signaling transmitted from the base station, to obtain the CSI feedback scheme configured for the UE by the base station, and to feed back CSI in the CSI feedback scheme configured for the UE by the base station upon determining that aperiodic CSI reporting is triggered.

In the embodiment, the base station can be embodied as the base station according to the foregoing embodiment, and the UE can be embodied as the UE according to the foregoing embodiment.

The invention proposes the solutions to a multi-carrier CSI feedback over a PUSCH in a multi-carrier system, and the base station can select an appropriate aperiodic CSI feedback scheme dependent upon carrier configuration information of the UE and also in combination with a carrier configuration condition of the system to thereby improve the flexibility of designing the system.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method of indicating a Channel State Information (CSI) feedback, comprising:

a base station configuring a User Equipment (UE) with a CSI feedback scheme; and the base station transmitting the configured CSI feedback scheme to the UE in configuration signaling to indicate the CSI feedback scheme to be adopted by the UE in aperiodic CSI reporting, wherein the base station configuring the UE with the CSI feedback scheme further comprises:

the base station configuring the UE with the corresponding CSI feedback scheme dependent upon a carrier configuration condition of the UE, wherein the CSI feedback scheme configured for the UE by the base station comprises a joint feedback scheme and a second independent feedback scheme; and the joint feedback scheme is to put CSI of all the activated Downlink Component Carriers (DL CCs) of the UE over a Physical Uplink Shared Channel (PUSCH) scheduled by an Uplink Grant (UL grant) for feedback; and the second independent feedback scheme is to put CSI, of a DL CC having a system-level paired linking relationship with an Uplink Component Carrier (UL CC) scheduled by a UL grant, over a PUSCH scheduled by the UL grant for feedback.

2. The method according to claim 1, wherein the configuration signaling is Physical Downlink Control Channel (PDCCH) signaling specific to the UE, or Radio Resource Control (RRC) Signaling, or Media Access Control layer Control Element (MAC CE) signaling specific to the UE.

3. The method according to claim 1, wherein the CSI feedback scheme configured for the UE by the base station further comprises a first independent feedback scheme; and the first independent feedback scheme is to put CSI, of a DL CC over which a UL grant is transmitted from the base station, over a PUSCH scheduled by the UL grant for feedback.

4. The method according to claim 1, wherein the base station configuring the UE with the corresponding CSI feedback scheme dependent upon the carrier configuration condition of the UE further comprises:

configuring the UE with the second independent feedback scheme when the UE is configured symmetrically with UL CCs and DL CCs.

5. The method according to claim 3, wherein the base station configuring the UE with the corresponding CSI feedback scheme dependent upon the carrier configuration condition of the UE further comprises:

configuring the UE with the first independent feedback scheme or the second independent feedback scheme when the UE is configured symmetrically with UL CCs and DL CCs and the difference in channel quality between the DL CCs configured for the UE satisfies a preset requirement; and configuring the UE with the second independent feedback scheme when the UE is configured symmetrically with UL CCs and DL CCs and the difference in channel quality between the DL CCs configured for the UE does not satisfy the preset requirement.

6. The method according to claim 1, wherein the base station configuring the UE with the corresponding CSI feedback scheme dependent upon the carrier configuration condition of the UE further comprises:

configuring the UE with the joint feedback scheme when the UE is configured asymmetrically with UL CCs and DL CCs.

7. A method of feeding back Channel State Information (CSI), comprising:
- a User Equipment (UE) receiving configuration signaling transmitted from a base station and obtaining a CSI feedback scheme configured for the UE by the base station; and
- the UE feeding back CSI in the CSI feedback scheme configured for the UE by the base station upon determining that aperiodic CSI reporting is triggered,
- wherein the UE determining that aperiodic CSI reporting is triggered further comprises:
- the UE determining that aperiodic CSI reporting is triggered, according to an Uplink Grant (UL grant) transmitted from the base station in which a Channel Quality Indicator (CQI) Request is set,
- wherein the UE feeding back CSI in the CSI feedback scheme configured for the UE by the base station further comprises:
- putting CSI of all the activated Downlink Component Carriers (DL CCs) of the UE over a Physical Uplink Shared Channel (PUSCH) scheduled by an Uplink Uplink Grant (UL grant) for feedback upon determining the CSI feedback scheme configured for the UE by the base station as a joint feedback scheme; and
- putting CSI, of a DL CC having a system-level paired linking relationship with an Uplink Component Carrier (UL CC) scheduled by a UL grant, over a PUSCH scheduled by the UL grant for feedback upon determining the CSI feedback scheme configured for the UE by the base station as a second independent feedback scheme.

8. The method according to claim 7, wherein the configuration signaling is Physical Downlink Control Channel (PDCCH) signaling specific to the UE or Radio Resource Control (RRC) Signaling or Media Access Control layer Control Element (MAC CE) signaling specific to the UE.

9. The method according to claim 7, wherein the UE feeding back CSI in the CSI feedback scheme configured for the UE by the base station further comprises:
- putting CSI, of a DL CC over which a UL grant is transmitted from the base station, over a PUSCH scheduled by the UL grant for feedback upon determining the CSI feedback scheme configured for the UE by the base station as a first independent feedback scheme.

10. The method according to claim 7, wherein the CSI feedback scheme obtained by the UE is the second independent feedback scheme when the UE is configured symmetrically with UL CCs and DL CCs; or
- the CSI feedback scheme obtained by the UE is the joint feedback scheme when the UE is configured asymmetrically with UL CCs and DL CCs.

11. The method according to claim 9, wherein the CSI feedback scheme obtained by the UE is the first independent feedback scheme or the second independent feedback scheme when the UE is configured symmetrically with UL CCs and DL CCs and the difference in channel quality between the DL CCs configured for the UE satisfies a preset requirement; and
- the CSI feedback scheme obtained by the UE is the second independent feedback scheme when the UE is configured symmetrically with UL CCs and DL CCs and the difference in channel quality between the DL CCs configured for the UE does not satisfy the preset requirement.

12. A base station, comprising:
- a feedback scheme configuring unit configured to configure a User Equipment (UE) with a Channel State Information (CSI) feedback scheme; and
- a feedback scheme indicating unit configured to transmit the configured CSI feedback scheme to the UE in configuration signaling to indicate the CSI feedback scheme to be adopted by the UE in aperiodic CSI reporting,
- the feedback scheme configuring unit is further configured to configure the UE with the corresponding CSI feedback scheme dependent upon a carrier configuration condition of the UE,
- wherein the feedback scheme configuring unit is further configured to configure the UE with a joint feedback scheme and a second independent feedback scheme; and
- the joint feedback scheme is to put CSI of all the activated Downlink Component Carriers (DL CCs) of the UE over a Physical Uplink Shared Channel (PUSCH) scheduled by an Uplink Grant (UL grant) for feedback; and
- the second independent feedback scheme is to put CSI, of a DL CC having a system-level paired linking relationship with an Uplink Component Carrier (UL CC) scheduled by a UL grant, over a PUSCH scheduled by the UL grant for feedback.

13. The base station according to claim 12, wherein the configuration signaling adopted by the feedback scheme indicating unit is Physical Downlink Control Channel (PDCCH) signaling specific to the UE or Radio Resource Control (RRC) Signaling or Media Access Control layer Control Element (MAC CE) signaling specific to the UE.

14. The base station according to claim 12, wherein the feedback scheme configuring unit is further configured to configure the UE with a first independent feedback scheme; and
- the first independent feedback scheme is to put CSI, of a DL CC over which a UL grant is transmitted from the base station, over a PUSCH scheduled by the UL grant for feedback.

15. The base station according to claim 12, wherein the feedback scheme configuring unit is further configured to configure the UE with the second independent feedback scheme when the UE is configured symmetrically with UL CCs and DL CCs; or to configure the UE with the joint feedback scheme when the UE is configured asymmetrically with UL CCs and DL CCs.

16. A User Equipment (UE), comprising:
- a feedback scheme obtaining unit configured to receive configuration signaling transmitted from a base station and to obtain a CSI feedback scheme configured for the UE by the base station; and
- a CSI feedback unit configured to feed back CSI in the CSI feedback scheme configured for the UE by the base station upon determining that aperiodic CSI reporting is triggered,
- wherein the CSI feedback unit is further configured to determine that aperiodic CSI reporting is triggered, according to the Uplink Grant (UL grant) transmitted from the base station in which a Channel Quality Indicator (CQI) Request is set,
- wherein the CSI feedback unit is further configured to put CSI of all the activated Downlink Component Carriers (DL CCs) of the UE over a Physical Uplink Shared Channel, PUSCH, Channel (PUSCH) scheduled by an Uplink Grant (UL grant) for feedback upon determining the CSI feedback scheme configured for the UE by the base station as a joint feedback scheme; and to put CSI, of a DL CC having a system-level paired linking relationship with an Uplink Component Carrier (UL CC) scheduled by a UL grant, over a PUSCH scheduled by the UL grant for feedback upon determining the CSI feedback scheme configured for the UE by the base station as a second independent feedback scheme.

17. The UE according to claim 16, wherein the configuration signaling is Physical Downlink Control Channel (PDCCH) signaling specific to the UE or Radio Resource Control (RRC) Signaling or Media Access Control layer Control Element (MAC CE) signaling specific to the UE.

18. The UE according to claim 16, wherein the CSI feedback scheme obtained by the feedback scheme obtaining unit is the second independent feedback scheme when the UE is configured symmetrically with UL CCs and DL CCs; or the CSI feedback scheme obtained by the feedback scheme obtaining unit is the joint feedback scheme when the UE is configured asymmetrically with UL CCs and DL CCs.

* * * * *